United States Patent Office 3,515,670
Patented June 2, 1970

3,515,670
IODOETHYL-SUBSTITUTED ORGANOSILICON COMPOUND LUBRICATING COMPOSITIONS AND USE THEREOF
Edgar D. Brown, Jr., Schenectady, N.Y., assignor to General Electric Company, a corporation of New York
No Drawing. Filed Sept. 11, 1967, Ser. No. 666,947
Int. Cl. C10m 1/50
U.S. Cl. 252—49.6            9 Claims

ABSTRACT OF THE DISCLOSURE

Organosilanes and organosiloxanes containing silicon-bonded iodoethyl groups have been found useful per se as lubricants and lubricant additives, particularly for lubricating difficult to lubricate surfaces, such as stainless steel and titanium. A typical lubricating compound is bis-(beta-iodoethyl)tetramethyldisiloxane. This compound is useful as an additive for silicone fluids and conventional hydrocarbon lubricants.

---

This invention relates to lubricating compositions comprising organosilicon compounds containing silicon-bonded beta-iodoethyl groups and to the use of such compositions in lubricating applications.

The use of elemental iodine as an additive to lubricant compositions and the use of complexes of iodine as lubricants and additives to lubricants is known in the art. While the presence of iodine in lubricating compositions has provided certain benefits, including an improvement in the ability of many materials to lubricate difficult metal surfaces, the use of such iodine materials has had several drawbacks. The principal drawback of such compositions has been that the compositions were generally quite volatile and tended to vaporize away from the lubricating surface. In addition, the compositions often decomposed to produce elemental iodine and hydrogen iodide which are relatively hazardous and which present problems of corrosion, often severe, of the metal surfaces being lubricated.

The present invention is based on my discovery that the foregoing disadvantages may be reduced and, in some cases, substantially eliminated, by employing a lubricating composition comprising an iodoethyl-substituted organosilicon compound selected from the class consisting of silanes having the formula.

(1)         $ICH_2CH_2Si(R)_3$ and siloxanes having the formula:

(2)         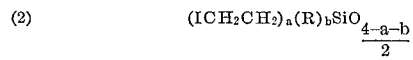

where R is a monovalent hydrocarbon radical free of aliphatic unsaturation, $a$ has a value of from about 0.05 to 1.0, inclusive; $b$ has a value of from about 1.00 to 2.00, inclusive; and the sum of $a$ plus $b$ is equal to from about 2.00 to 3.00, inclusive. The composition of Formulas 1 and 2 are much less volatile than compositions containing free iodine or compounds containing iodine in the form of a complex. This greatly decreased volatility reduces the concentration of iodine-containing vapors in the vicinity of the surfaces being lubricated and, therefore, eliminates the need for complex apparatus for removing iodine-containing vapors from the vicinity of the surfaces being lubricated. In addition to being much less volatile than prior art compositions, the compositions of Formula 1 and Formula 2 are also much more stable. Thus, the tendency for these compositions to decompose with the liberation of iodine and hydrogen iodide is greatly reduced and again the need for complicated ventilation equipment for removing vapors is lessened.

The iodoethyl-substituted organosilicon compounds of Formulas 1 and 2 can be used alone as lubricants for lubricating two solid surfaces between which there is relative motion, and can also be used as additives to improve the ability of other materials to lubricate surfaces which are difficult to lubricate. In the preferred embodiment of my invention, the iodoethyl organosilicon compounds are employed as additives to other lubricating compositions. The iodoethyl organosilicon compounds and the lubricating compositions containing the iodoethyl organosilicon compounds as additives are all especially useful in the lubrication of difficult to lubricate tool steels and high temperature alloys, such as 304 stainless steel, titanium, and nickel alloys.

The iodoethyl-substituted organosilicon compounds within the scope of Formula 1 include a great variety of different materials. These materials are characterized by the presence of the silicon-bonded monovalent hydrocarbon radical free of aliphatic unsaturation which is represented by R in both Formula 1 and Formula 2 and by the presence of the silicon-bonded iodoethyl group. Included within the monovalent hydrocarbon radicals free of aliphatic unsaturation within the scope of R are, for example, alkyl radicals, such as methyl, ethyl, propyl, butyl, isobutyl, octyl, octadecyl, etc. radicals, with the preferred alkyl radicals being lower alkyl radicals containing from 1 to 7 carbon atoms; cycloalkyl radicals, e.g., cyclohexyl, cycloheptyl,etc. radicals; aryl radicals, e.g., phenyl, xylyl, tolyl, naphthyl, etc. radicals, with the preferred aryl radicals being monocyclic aryl radicals; aralkyl radicals, e.g., benzyl, phenylethyl, and other phenyl lower alkyl radicals, etc. The preferred specific radicals represented by R are methyl and phenyl, with the methyl radical being most preferred. In a given organosilicon compound within the scope of Formula 1 or Formula 2, all of the R groups can be the same or a mixture of R groups can be present.

The iodoethyl-substituted organosiloxanes within the scope of Formula 2 comprise one or more siloxane units having the formula:

(3)         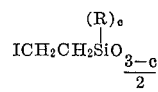

alone or in combination with siloxane units having the formula:

(4)         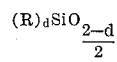

where R is as previously defined, $c$ is a whole number equal to from 1 to 2, inclusive, and $d$ is a whole number equal to from 0 to 3, inclusive. The proportions of the siloxane units of Formula 3 and the siloxane units of Formula 4 in the organopolysiloxane are selected so as to provide a total of from 0.05 to 1.0 silicon-bonded iodoethyl radicals per silicon atom, from 1.00 to 2.00 R groups per silicon atom, and with a total of from 2.00 to 3.00 iodoethyl groups plus R groups per silicon atom, all of which are selected to place the iodoethyl-substituted organosilicon compound within the scope of Formula 2.

Included within the scope of the iodoethyl-substituted silanes of Formula 1 can be mentioned, for example, beta-iodoethyltrimethylsilane, beta-iodoethyltriphenylsilane, beta-iodoethylmethyldiphenylsilane, beta-iodoethyltriethylsilane, etc.

The iodoethyl-substituted organopolysiloxanes of Formula 2 include linear siloxanes, branched chain siloxanes and cyclopolysiloxanes. These materials are generally liquids but, in some special cases, the products are waxy or crystalline solids which melt at moderately elevated temperatures. Typical of some of the simpler compounds within the scope of the iodoethyl-substituted siloxanes of Formula 2 are beta-iodoethylpentamethyldisiloxane, 1,3 - bis(beta-iodoethyl)tetramethyldisiloxane, beta-iodoethylheptamethylcyclotetrasiloxane, methyl-beta-iodoethylsiloxane cyclic tetramer, low viscosity trimethylsilyl chain-stopped poly(methyl-beta-iodoethyl)siloxanes, etc.

The preparation of the iodoethyl-substituted silanes of Formula 1 and siloxanes of Formula 2 is very straightforward and comprises the reaction between gaseous hydrogen iodide and vinyl-containing organosilicon compounds. The vinyl-containing organosilicon compound has a formula selected from the class consisting of:

(5) $\quad CH_2=CHSi(R)_3$ and (6) $\quad (CH=CH)_a(R)_bSiO_{\frac{4-a-b}{2}}$ where R, $a$ and $b$ are as previously defined. The hydrogen iodide adds across the double bond of the silicon-bonded vinyl group without catalyst and with a slight exotherm. The addition results primarily in the formation of the beta-iodoethyl adduct, but a small amount of the alpha-iodoethyl adduct is formed.

While the reaction between the vinyl-containing organosilicon compound of Formula 5 or Formula 6 and gaseous hydrogen iodide theoretically requires one mole of hydrogen iodide per mole of silicon-bonded vinyl groups, it is desirable to insure that all silicon-bonded vinyl groups are converted to iodoethyl groups. Therefore, an excess of hydrogen iodide is generally employed in the reaction. A suitable excess of hydrogen iodide is generally from about 10 to 50% excess, with perfectly satisfactory results being obtained when the amount of hydrogen iodide employed is in the range of about 25% excess.

Since the starting vinyl-containing organosilicon compound of Formula 5 or Formula 6 is most often a liquid, the reaction mixture consists only of the vinyl-containing organosilicon compound and the hydrogen iodide. The most convenient method for effecting reaction is to place the vinyl-containing organosilicon compound in a reaction vessel and to bubble gaseous hydrogen iodide into the liquid organosilicon compound. The progress of the reaction can be followed by infrared analysis, with the disappearance of the band corresponding to the vinyl radical indicating completion of the reaction. Generally, the reaction is allowed to proceed under autogenous temperature and atmospheric pressure with the time of the reaction being from about 1 to 2 hours. The rate of reaction is increased by employing slightly elevated hydrogen iodide pressures, but the extra benefit obtained from the increased reaction rate does not usually off-set the increased costs for appropriate equipment.

After completion of the addition of hydrogen iodide to the reaction mixture, the reaction mixture is washed with water to remove unreacted hydrogen iodide, is dried with sodium sulfate and filtered to produce an iodoethyl-substituted silane within the scope of Formula 1 or an iodoethyl-substituted siloxane within the scope of Formula 2. As previously mentioned, the addition reaction results in the formation primarily of the beta-iodoethyl-substituted material and the minor amount of alpha-iodoethyl adduct has no adverse effect on the utility of the reaction product and it is not necessary to separate the beta adduct from the alpha adduct.

In those rare cases where the starting silane or siloxane of Formula 5 or Formula 6 is a solid material, or in those isolated cases in which the products are waxy solids rather than fluids, it is sometimes convenient to conduct the reaction in the presence of a solvent. Preferably, the solvent is one of high volatility which is inert to the reactants under the conditions of the reaction. Suitable solvents include, for example, diethylether, tetrahydrofuran, benzene, hexane, and similar materials. When a solvent is employed, it is generally employed in an amount equal to about 1 to 10 parts solvent per part of the vinyl-containing organosilicon compound of Formula 5 or Formula 6. The reaction between the gaseous hydrogen iodide and the vinyl-containing organosilicon compound is carried out in the same manner as before, except that after the addition reaction is completed, the solvent is stripped after washing of the reaction mixture to remove unreacted hydrogen iodide.

The iodoethyl-substituted organosilicon compounds of the present invention are useful per se as lubricants and are especially useful as additives for other lubricating materials and even as additives for converting very poor lubricating materials into useful lubricating materials.

In utilizing the iodoethyl-substituted organosilanes and organopolysiloxanes of the present invention per se as lubricating compositions, these compositions are used as other lubricants to reduce the friction between two solid surfaces which move relative to each other. Likewise, when these materials are employed as additives for other lubricating materials, the same typical method of application is employed. The lubricating oils to which the iodoethylsilanes and siloxanes are added include any type of lubricating oils ranging from gasoline and kerosene to other common lubricating oil materials. The preferred class of lubricating oils which are the base lubricating fluid in one embodiment of my invention are the hydrocarbon oils and the silicone oils. Suitable hydrocarbons are those occurring naturally in petroleum and particularly are those useful for lubrication of machinery, e.g., neutral oils having a viscosity between about 50 SUS at 100° F. and 2,000 SUS at 100° F. or bright stocks having a viscosity between 90 and 300 SUS at 210° F., but any petroleum product which is required to have oiliness in certain uses can be improved in this property by adding the iodoethylsilanes and siloxanes of the present invention. The preferred petroleum hydrocarbons are those boiling above 300° F. and especially preferred are those boiling above 500° F. at atmospheric pressure.

For many of the usual applications of this invention, lubricating oils, curing oils, metal working oils, hydraulic fluids, pneumatic equipment oils, spindle oils, gear oils, and the like can be used as the base lubricating fluid. It is contemplated in one of the preferred embodiments of my invention that the lubricating oils include straight mineral lubricating oils or distillates derived from paraffinic, naphthenic, asphaltic or mixed base crudes or, if desired, various blended oils can be employed as well.

The silicone oils which can be used as the base fluid in the compositions of the present invention include those silicones described in Pat. 2,469,888—Patnode, which comprise conventional silicone materials which are commercially available from a number of sources. These organopolysiloxanes are characterized by the general formula:

(7) $\quad (Y)_nSiO_{\frac{4-n}{2}}$ where Y is a member selected from the class consisting of monovalent hydrocarbon radicals, halogenated monovalent hydrocarbon radicals, and cyanoalkyl radicals, and $n$ has a value of from about 2.001 to 2.2. The radicals represented by Y in Formula 7 are the conventional radicals usually associated with silicone materials and include alkyl radicals, e.g., methyl, ethyl, propyl, butyl, octyl, octadecyl, etc., radicals; aryl radicals, e.g., phenyl, naphthyl, tolyl, xylyl, etc. radicals; aralkyl radicals, e.g., benzyl, phenylethyl, etc. radicals; cycloaliphatic radicals, e.g., cyclohexyl, cycloheptyl, etc., radicals; unsaturated aliphatic radicals, e.g., vinyl, allyl, cyclohexenyl, etc. radicals; halogenated monovalent hydrocarbon radicals, e.g., chloromethyl, chloroethyl, dibromophenyl, alpha,alpha,alpha-trifluoropropyl, etc. radicals; cyanoalkyl radicals, e.g., cyanoethyl, gamma-cyanopropyl, beta-cyanopropyl, etc. radicals. In the preferred embodiment of my invention, the radicals represented by Y are monovalent hydrocarbon radicals free of aliphatic unsaturation and in the preferred specific embodiment of my invention, the radicals are selected from the class consisting of methyl and phenyl, with the preferred radical of this pair being methyl radicals.

In preparing the lubricating compositions of the present invention which contain the iodoethyl-substituted organosilicon compound of Formula 1 or Formula 2 and a lubricating oil, the iodoethyl-substituted organosilicon compound is merely dissolved or dispersed in the lubricating oil to form the desired composition. In general, the amount of the iodoethyl-substituted organosilicon compound which can be added to the lubricating oil varies within wide limits. However, one of the beneficial features of the present invention is that excellent lubricating characteristics are obtained when only small amounts of the iodoethyl-substituted organosilicon compound is added. Suitable amounts include, for example, from about 0.01 to 10 parts by weight of the iodoethyl-substituted organosilicon compound per 100 parts of the lubricating base fluid.

In addition to the iodoethyl-substituted organosilicon compound, the lubricating compositions of the present invention can also include other additives, such as wetting agents, fillers, thickeners, and dyes. In some instances, it is advantageous to add minor amounts, from about 5 to 20 percent by weight of mutual solvents for both the iodoethyl-substituted organosilicon compound and the base lubricating fluid. The various fillers are used to obtain grease-like consistency and are generally non-abrasive fillers, such as silica gel, carbon black, diatomaceous earth, graphite, etc.

The iodoethyl-substituted organosilicon compounds of Formula 1 and Formula 2 and the lubricating compositions of the present invention can be used to lubricate a plurality of pairs of surfaces which move with respect to each other. These compositions are particularly useful in the lubrication of surfaces which heretofore have been almost impossible to lubricate by any convenient method. Of particular utility is the lubrication of two solid surfaces moving relative to each other when at least one of the surfaces is a metal which is at least 50% titanium. The other surface may be a metal used for fabricating structural shapes, e.g., iron, molybdenum, silver, copper, beryllium, tungsten, magnesium, titanium, zirconium, chromium, nickel, cobalt, aluminum, tin, etc., and various metal compositions, for example, high and low temperature alloys, of which typical examples are steels, brasses, the various alloys of magnesium, cobalt, nickel, chromium, zinc, zirconium, beryllium, aluminum, iron, etc.

In addition to lubricating surfaces which include titanium, the compositions of the present invention are also useful as extreme pressure lubricating compositions for pairs of metal surfaces moving relative to each other when neither of the surfaces contains titanium. Thus, these compositions are useful for lubricating any combination of two of the surfaces previously described. The present invention is especially useful for the lubrication of heat resistant alloys, such as those commercially available under the names of Rene 41, Inconel 718, Monel K, Castaloy C, and Udimet, all of which are nickel base alloys of published composition.

The amount of iodoethyl-substituted organosilicon compound used alone or in combination with a hydrocarbon or silicone base oil can vary within wide limits, which are within the skill of those having ordinary skill in the lubricating art. The amount of the iodoethyl-substituted silicon compound is merely selected to insure that there is a lubricating supply of the lubricant composition between the surfaces which are being lubricated.

The following examples are illustrative of the preparation of compositions employed in the practice of the present invention, of the preparation of compositions within the scope of the present invention, and of the method of lubricating moving surfaces within the scope of the present invention. These examples are illustrative only, and are not intended for purposes of limitation. All parts are by weight.

EXAMPLE 1

To a reaction vessel was added 46.5 g. of 1,3-divinyl-tetramethyldisiloxane at 20° C. To this disiloxane was added 80 g. (25% molar excess) of gaseous hydrogen iodide at room temperature. During the beginning of the addition, the initially clear disiloxane became cloudy and then cleared and turned to a light pink color. During the two hours over which the gaseous hydrogen iodide was bubbled into the reaction mixture, the temperature rose about 40° C. At the end of the addition, infrared analysis showed the disappearance of the peaks at 6.25 and 7.1 microns, which corresponded to the silicon-bonded vinyl group initially present in the disiloxane. A new peak at 8.2 microns, corresponding to the beta-iodoethyl group, was formed. At the end of this time, the reaction mixture was washed twice with water to remove unreacted hydrogen iodide and then the reaction mixture was dried with sodium sulfate and filtered. The resulting product was bis-(beta-iodoethyl)tetramethyldisiloxane which was a low viscosity fluid. The lubricating characteristics of this bis-iodoethyltetramethyldisiloxane as an additive in a methylphenyl silicone fluid was compared with the lubricating characteristics of the methylphenyl silicone fluid alone and with a methyl silicone fluid alone, with respect to the lubrication of 52-100 tool steel. The lubricating characteristics of these fluids were evaluated with a Shell Four Ball Wear Tester which is well known in the art, and which employed four 52-100 steel balls maintained in a reservoir of the fluid under test at a temperature of 167° F. and employing a speed of 600 r.p.m. for the rotating ball. The test was run for one hour and the wear scar was measured at the end of this time. Tests were run under loads of 10 kg., 15 kg., 20 kg., or 40 kg. In the table below are listed the various lubricants evaluated and the wear scar observed in millimeters. The "methylphenyl" lubricant listed in Table I was tris(trimethylsiloxy)phenylsilane, which had a viscosity of 5 centistokes at 25° C. The "methyl" lubricant was a trimethylsilyl chain-stopped dimethylpolysiloxane having a viscosity of 50 centistokes at 25° C. The three compositions within the scope of the present invention were solutions of the bis-iodoethyltetramethyldisiloxane dissolved in the methylphenylpolysiloxane fluid just described. Three different levels of the additive were employed, 10%, 1%, and 0.5%, based on the weight of the methylphenyl silicone fluid.

TABLE I

| Lubricant | Wear scar | | | |
| --- | --- | --- | --- | --- |
| | 10 kg. | 15 kg. | 20 kg. | 40 kg. |
| Methylphenyl | 2.9 | 3.6 | | 5.8 |
| Methyl | | | | 1.8 |
| 10% iodoethyl in methylphenyl | 0.30 | | | |
| 1.0% iodoethyl in methylphenyl | | | 0.30 | 0.79 |
| 0.5% iodoethyl in methylphenyl | 0.30 | | | 1.3 |

As shown in Table I, the compositions of the present invention are vastly superior to the methylphenyl silicone fluid alone. Stated alternatively, as little as 0.5% by weight of the bis-iodoethyltetramethyldisiloxane in the methylphenylsiloxane fluid reduces the wear scar under a 10 kg. load from 2.9 mm. to 0.30 mm. Likewise, at a 40 kg. load, the wear scare under the same circumstances is reduced from 5.8 mm. to 1.3 mm. The compositions of the present invention are also superior to conventional methyl silicone lubricating fluids in that as little as 0.5% of the bis-iodoethyltetramethyldisiloxane in the methylphenyl silicone fluid has a wear scar of only 1.3 mm. under a 40 kg. load as compared with a 1.8 mm. wear scar from a conventional methyl silicone lubricating fluid. Examination of the 52-100 tool steel balls at the end of the test showed that the corrosion of the balls caused by the solution of the disiloxane in the methylphenyl silicone fluid ranged from slight for the 10% concentration down to none for the 0.5% concentration.

Furthermore, practically no decomposition of the lubricant was observed during the test.

EXAMPLE 2

To a reaction vessel was added 22.2 g. of 1,3,5,7-tetravinyl-1,3,5,7-tetramethylcyclotetrasiloxane and over a one hour period 41.3 g. (25% excess) of gaseous hydrogen iodide was bubbled into the reaction mixture. The reaction temperature rose from room temperature to about 35 to 40° C. during the addition. At the end of the addition, the reaction was complete as evidenced by the disappearance of the 6.25 and 7.1 micron peaks corresponding to the silicon-bonded vinyl group in the cyclotetrasiloxane and by the appearance of a strong peak at 8.2 microns corresponding to the beta-iodoethyl group. At the conclusion of the reaction, the reaction mixture was washed with water, dried with sodium sulfate, and filtered to produce 1,3,5,7-tetrakis-beta-iodoethyl-1,3,5,7-tetramethylcyclotetrasiloxane which solidified to a waxy material upon standing. At a temperature of about 80° C., this cyclotetrasiloxane was a low viscosity liquid. When this material was evaluated alone in the Shell Four Ball Wear Test at a temperature of 167° F. and a speed of 600 r.p.m. under a 40 kg. load, the wear scar was 0.50 mm. when the four balls were 52–100 tool steel. The wear scar was 0.80 mm. when the four balls were 304 stainless steel. In another evaluation employing a temperature of 167° C., a speed of 60 r.p.m., a load of 10 kg., a wear scar of 1.6 mm. was obtained after 10 minutes employing a 304 stainless steel rotating ball against three stationary titanium balls. When white mineral oil was used as a lubricant with four 304 stainless steel balls at 167° C. and 600 r.p.m. under a 30 kg. load, lubrication was so poor that the test could not be run. When the white mineral oil was modified by adding thereto 2% by weight, based on the weight of the mineral oil, of the iodoethyl-substituted cyclotetrasiloxane, the wear scar under the same conditions was only 1.1 mm. There was no significant decomposition of the iodoethyl-substituted cyclotetrasiloxane in any of the lubricant evaluations. In contrast to this, when iodine was dissolved in benzene and the benzene was dissolved in white mineral oil in an amount sufficient to provide 1.0% iodine based on the total weight of the lubricating composition, iodine sublimation and evaporation were so bad at 167° F. at 600 r.p.m. under a 30 kg. load that the run had to be discontinued before the end of one hour.

EXAMPLE 3

To a reaction vessel was added 100 g. of a dimethylphenyl chain-stopped copolymer of methylvinylsiloxane units and dimethylsiloxane units in which the average molecule contained four methylvinylsiloxane units and 94 dimethylsiloxane units and had a viscosity of 100 centistokes at 25° C. To this vinyl-containing silicone fluid was added 13 g. (25% excess) of gaseous hydrogen iodide by bubbling the hydrogen iodide into the reaction mixture over a one hour period. The course of the reaction was again observed by noting the disappearance of the vinyl infrared peak and by noticing the strong peak at 8.2 microns, corresponding to the silicon-bonded beta-iodoethyl group. Following the procedure of earlier examples, this fluid was used in the lubrication of type 52–100 tool steel at a temperature of 167° F., a speed of 600 r.p.m. for one hour under a load of 20 kg. The resulting wear scar was 0.6 mm. and no significant decomposition of the fluid occurred.

EXAMPLE 4

To a reaction vessel is charged 50 parts of vinyltrimethylsilane and over a one hour period gaseous hydrogen iodide in the amount of 89.5 parts (40% excess) is added thereto. The course of the reaction is followed by the infrared observation of the disappearance of the peak corresponding to the silicon-bonded vinyl group and the appearance of the peak corresponding to the beta-iodoethyl group. The resulting material is a high melting solid. When 6 parts of this solid are dissolved in 100 parts of white mineral oil, the resulting product shows a wear scar of 1.2 mm. in the Shell Four Ball Test employing four 304 stainless steel balls, a load of 20 kg., a speed of 600 r.p.m., and a temperature of 167° F. for one hour.

While the foregoing examples have illustrated many of the embodiments of my invention, it should be understood that my invention is directed broadly to compositions comprising a beta-iodoethyl-substituted silane within the scope of Formula 1 or a beta-iodoethyl-substituted siloxane within the scope of Formula 2 dissolved in a hydrocarbon oil of lubricating viscosity or a silicone oil of lubricating viscosity. This invention also is directed to the use of the iodo-substituted silanes of Formula 1 and the iodoethyl-substituted siloxanes of Formula 2 as lubricants for the lubrication of two surfaces which are moving relative to each other. This invention also relates to the use of compositions comprising the iodoethyl-substituted silane or siloxane in a hydrocarbon or silicone oil of lubricating viscosity for the lubrication of relatively moving parts as previously described.

What I claim as new and desire to secure by Letters Patent of the United States is:

1. A composition comprising (A) a minor amount, but sufficient to improve lubrication of an iodoethyl-substituted organosilicon compound selected from the class consisting of iodoethyl-substituted silanes having the formula:

$$ICH_2CH_2Si(R)_3$$

and iodoethyl-substituted siloxanes having the formula:

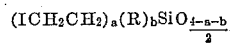

$$(ICH_2CH_2)_a(R)_bSiO_{\frac{4-a-b}{2}}$$

and (B) a major amount of lubricating fluid selected from the class consisting of hydrocarbon oils and silicone oils of lubricating viscosity, where R is a monovalent hydrocarbon radical free of aliphatic unsaturation, $a$ has a value of from about 0.05 to 1.0, inclusive; $b$ has a value of from about 1.00 to 2.00, inclusive; and the sum of $a$ plus $b$ is equal to from about 2.00 to 3.00, inclusive.

2. The composition of claim 1 in which said iodoethyl-substituted organosilicon compound is a siloxane.

3. The composition of claim 1 in which said lubricating fluid is a silicone oil.

4. The composition of claim 1 in which said iodoethyl-substituted organosilicon compound is a siloxane and in which said lubricating fluid is a silicone oil.

5. The process of lubricating two solid surfaces between which there is relative motion which comprises maintaining a film of lubricant between the two surfaces, said lubricant comprising a lubrication improving amount of a member selected from the class consisting of beta-iodoethyl-substituted silanes having the formula:

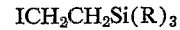

$$ICH_2CH_2Si(R)_3$$

and beta-iodoethyl-substituted siloxanes having the formula:

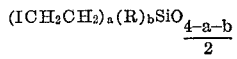

$$(ICH_2CH_2)_a(R)_bSiO_{\frac{4-a-b}{2}}$$

where R represents a monovalent hydrocarbon radical free of olefinic unsaturation, $a$ has a value of from about 0.05 to 1.0, inclusive; $b$ has a value of from about 1.00 to 2.00, inclusive; and the sum of $a$ plus $b$ is equal to from about 2.00 to 3.00, inclusive.

6. The method of claim 5 in which said lubricant comprises a major amount of siloxane.

7. The method of claim 5 in which said lubricant comprises a major amount of siloxane and R is a member selected from the class consisting of methyl and phenyl and mixtures thereof.

8. The method of claim 5 in which said lubricant includes a major amount of an oil of lubricating viscosity selected from the class consisting of hydrocarbon oils and silicone oils of lubricating viscosity.

9. The method of claim 8 in which said oil of lubricating viscosity is a silicone oil.

References Cited

UNITED STATES PATENTS

| | | | |
|---|---|---|---|
| 2,561,178 | 7/1951 | Burkhard | 252—49.6 |
| 3,184,413 | 5/1965 | Furey et al. | 252—58 X |
| 3,232,875 | 2/1966 | Young et al. | 252—58 X |
| 3,291,735 | 12/1966 | Brown | 252—49.6 |
| 3,423,318 | 1/1969 | Bawer et al. | 252—49.6 |

DANIEL E. WYMAN, Primary Examiner

W. H. CANNON, Assistant Examiner

U.S. Cl. X.R.

260—448.2